(12) United States Patent
Ryu et al.

(10) Patent No.: US 8,673,476 B2
(45) Date of Patent: Mar. 18, 2014

(54) ELECTRODE ASSEMBLY HAVING STABLE LEAD-TAP JOINT AND ELECTROCHEMICAL CELL CONTAINING THEM

(75) Inventors: Ji Heon Ryu, Seoul (KR); Jeong Hee Choi, Busan (KR); Kwangho Yoo, Daejeon (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 484 days.

(21) Appl. No.: 12/309,506

(22) PCT Filed: Jul. 14, 2007

(86) PCT No.: PCT/KR2007/003435
§ 371 (c)(1),
(2), (4) Date: Jun. 24, 2009

(87) PCT Pub. No.: WO2008/010656
PCT Pub. Date: Jan. 24, 2008

(65) Prior Publication Data
US 2009/0305134 A1    Dec. 10, 2009

(30) Foreign Application Priority Data

Jul. 18, 2006  (KR) .................. 10-2006-0066653

(51) Int. Cl.
*H01M 4/00*  (2006.01)
*H01M 2/02*  (2006.01)

(52) U.S. Cl.
USPC ............. 429/121; 429/65; 429/122; 429/161; 429/162; 361/531

(58) Field of Classification Search
USPC ............. 429/65, 121, 122, 161, 162; 361/531
See application file for complete search history.

(56) References Cited

U.S. PATENT DOCUMENTS

| | | | |
|---|---|---|---|
| 5,849,431 A | * | 12/1998 | Kita et al. ............... 429/164 |
| 6,300,002 B1 | | 10/2001 | Webb et al. |
| 6,366,447 B1 | * | 4/2002 | Nakaaki ................ 361/518 |
| 2001/0053636 A1 | * | 12/2001 | Tamai et al. ............ 439/677 |
| 2005/0008933 A1 | * | 1/2005 | Ligeois et al. .......... 429/161 |
| 2006/0012330 A1 | * | 1/2006 | Okumura et al. ....... 320/103 |

FOREIGN PATENT DOCUMENTS

| | | | |
|---|---|---|---|
| JP | 10-255819 A | 9/1998 | |
| JP | 2000268880 A | 9/2000 | |
| JP | 2000-285903 | * 10/2000 | ............. H01M 2/30 |
| JP | 2000-285903 A | 10/2000 | |
| JP | 2001-057203 | * 2/2001 | ............. H01M 2/26 |
| JP | 1999233180 | 2/2001 | |
| JP | 2001-102034 A | 4/2001 | |
| JP | 2002043221 A | 2/2002 | |
| JP | 2003031626 A | 1/2003 | |
| KR | 10-2006-0020371 A | 3/2005 | |
| KR | 10-2006-0026602 A | 3/2006 | |

* cited by examiner

*Primary Examiner* — Ula C Ruddock
*Assistant Examiner* — Amanda Barrow
(74) *Attorney, Agent, or Firm* — Lerner, David, Littenberg, Krumholz & Mentlik, LLP

(57) ABSTRACT

Disclosed herein is a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, electrode leads are located at one-side ends of the stacked electrode tabs such that the electrode leads are electrically connected to the electrode tabs, and the electrode leads, joined to the electrode tabs, have rounded ends. An electrochemical cell including the electrode assembly is also disclosed.

18 Claims, 3 Drawing Sheets

Prior Art

ELECTRODE ASSEMBLY HAVING STABLE LEAD-TAP JOINT AND ELECTROCHEMICAL CELL CONTAINING THEM

CROSS REFERENCE TO RELATED APPLICATIONS

The present application is a national phase entry under 35U.S.C. §371 of International Application No. PCT/KR2007/003435, filed Jul. 14, 2007, published in English, which claims the benefit of Korean Patent Application No. KR10-2006-0066653, filed Jul. 18, 2006. The disclosures of said applications are incorporated by reference herein.

FIELD OF THE INVENTION

The present invention relates to an electrode assembly having a stable electrode lead-electrode tab joint, and, more particularly, to a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, electrode leads are located at one-side ends of the stacked electrode tabs such that the electrode leads are electrically connected to the electrode tabs, and the electrode leads, joined to the electrode tabs, have rounded ends, and an electrochemical cell including the same.

BACKGROUND OF THE INVENTION

As mobile devices have been increasingly developed, and the demand for such mobile devices has increased, the demand for batteries has also sharply increased as an energy source for the mobile devices. Also, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and long-sheet type anodes are wound while separators are disposed respectively between the cathodes and the anodes, a stacking type structure in which pluralities of cathodes and anodes having a predetermined size are successively stacked while separators are disposed respectively between the cathodes and the anodes, or a stacking/folding type structure in which pluralities of cathodes and anodes having a predetermined size are successively stacked while separators are disposed respectively between the cathodes and the anodes to constitute a bi-cell or a full-cell, and then the bi-cell or the full-cell is wound.

FIG. 1 is a side view typically illustrating the general structure of a conventional representative stacking type electrode assembly.

Referring to FIG. 1, the stacking type electrode assembly 10 is constructed in a structure in which cathodes 20, each of which has a cathode active material 22 applied to the opposite major surfaces of a cathode current collector 21, and anodes 30, each of which has an anode active material 32 applied to the opposite major surfaces of an anode current collector 31, are sequentially stacked while separators 80 are disposed respectively between the cathodes 20 and the anodes 30.

From one-side ends of the cathode current collectors 21 and the anode current collectors 31 protrude pluralities of cathode tabs 40 and anode tab 50, to which an active material is not applied, such that the cathode tabs 40 and the anode tab 50 are electrically connected to a cathode lead 60 and an anode lead (not shown) constituting electrode terminals of a battery (not shown). The cathode tabs 40 and the anode tab 50 are joined in a concentrated state, and are then connected to the cathode lead 60 and the anode lead, respectively. This structure is more clearly illustrated in FIG. 2, which is an enlarged view illustrating the joint between the electrode tabs and the electrode leads.

Referring to FIG. 2, the plurality of cathode tabs 40, which extend from the respective cathode current collectors 21 of the electrode assembly 10, and the plurality of anode tabs 50, which extend from the respective anode current collectors 31 of the electrode assembly 10, are connected to the cathode lead 60 and the anode lead 70, respectively, for example, by welding. The electrode leads 60 and 70 are generally manufactured through a process for punching a metal plate and cutting the punched metal plate into a predetermined size. As a result, sharp edges or sharply angled parts (circle A) may be formed at cut regions 61 and 62 of the cathode lead 60. According to circumstances, burrs (not shown) may be formed at the cut regions of the cathode lead. The sharply angled parts (circle A) and the burrs formed at the ends of the electrode leads may break the electrode tabs 40 and 50, which have a low mechanical strength, during the movement of the electrode assembly due to an external force applied to the electrode assembly.

On the other hand, a pouch-shaped secondary battery is constructed in a structure in which the electrode assembly with the above-stated construction is mounted in a pouch-shaped battery case made of a laminate sheet including a metal layer and a resin layer. In this case, the electrode leads, which are connected to the corresponding electrode tabs of the electrode assembly, are thermally welded to the battery case while the ends of the electrode leads opposite to the joint between the electrode leads and the electrode tabs are exposed to the outside of the battery case. Consequently, the electrode leads, having a predetermined thickness, deteriorates the sealability of the battery case. Furthermore, the battery case may be damaged by the sharply angled parts and the burrs formed at the ends of the electrode leads.

Therefore, there is a high necessity for a technology that is capable of preventing the damage to the electrode tabs and/or the battery case, even when the electrode leads are brought into contact with the electrode tabs and/or the battery case, during the movement of the electrode assembly.

SUMMARY OF THE INVENTION

Therefore, the present invention has been made to solve the above problems, and other technical problems that have yet to be resolved.

Specifically, it is an object of the present invention to provide an electrode assembly that is capable of preventing the damage to electrode tabs and/or a battery case due to ends of electrode leads during the movement of the electrode assembly due to an external force applied to the electrode assembly.

It is another object of the present invention to provide an electrode assembly that is capable of improving the sealability at a sealed region of the battery case.

It is a further object of the present invention to provide an electrochemical cell including the electrode assembly.

In accordance with one aspect of the present invention, the above and other objects can be accomplished by the provision of a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, electrode leads are located at one-side ends of the stacked electrode tabs such that the electrode leads are electrically connected to the electrode tabs, and the electrode leads, joined to the electrode tabs, have rounded ends.

The ends of the electrode leads of the electrode assembly according to the present invention are rounded. Consequently, it is possible to prevent the breakage of the electrode tabs or the damage to the battery case by sharp edges, angled parts, or burrs formed at the ends of the electrode leads, during the movement of the electrode assembly due to an external force applied to the electrode assembly, and therefore, it is possible to prevent the lowering of the sealability of the battery case or the increase of insulation resistance due to the current conduction of the electrode assembly. As a result, it is possible to greatly improve the safety of a secondary battery including the electrode assembly and to prevent the penetration of moisture or foreign matter into the battery due to the damage to the battery case or the lowering of the battery performance due to the damage to the electrode tabs, thereby securing the stable battery performance.

In a preferred embodiment, the ends of the electrode leads are rounded at opposite sides thereof when viewing the electrode leads from above. Here, the ends of the electrode leads means the ends of the electrode leads which are joined to the electrode tabs in the longitudinal direction of the major axis of the electrode leads when viewing the electrode leads from above. Preferably, the intersections between the ends of the electrode leads and the opposite sides of the electrode leads adjacent to the ends of the electrode leads at the sides of the electrode leads where the electrode tabs are joined to the electrode leads are rounded.

By the provision of the rounded structure, the electrode leads do not damage the electrode tabs and/or the battery case even when the ends of the electrode leads are brought into contact with the electrode tabs and/or the battery case. Consequently, when the battery case is made of a laminate sheet including a resin layer and a metal layer, it is possible to prevent the occurrence of an internal short circuit or the increase of insulation resistance due to the contact between the ends of the electrode leads and the metal layer of the battery case resulting from the damage to the resin layer by the ends of the electrode leads, thereby greatly improving the safety of the battery.

In the above-described structure, the opposite sides of the ends of the electrode leads are not particularly restricted so long as the opposite sides of the ends of the electrode leads are curved. Preferably, the opposite sides of the ends of the electrode leads are rounded with a radius having a size equivalent to $1/20$ to $1/3$ the width of the electrode leads.

In another preferred embodiment, the ends of the electrode leads are rounded at the outer circumferences thereof when viewing the vertical section of the electrode leads. Here, the ends of the electrode leads means the ends of the electrode leads which are joined to the electrode tabs in the longitudinal direction of the major axis of the electrode leads when viewing the electrode leads from above. Preferably, the intersections between four sides, i.e., the opposite lateral sides, the tops, and the bottoms, of the electrode leads, which are perpendicular to the ends of the electrode leads at the sides of the electrode leads where the electrode tabs are joined to the electrode leads, are rounded.

Experiments carried out by the inventors of the present application revealed that, when the electrode leads are constructed in the above-described rounded structure, the damage to the electrode tabs or the battery case was further considerably prevented. Specifically, the electrode leads are constructed in a structure in which the outer circumferences of the ends of the electrode leads, with the result that the contact area between the electrode leads and the sealed region of the battery case, in which the electrode assembly is mounted, is increased, and therefore, the sealability of the battery case is improved. Also, as described above, the damage to the electrode tabs and the battery case is effectively prevented even when the ends of the electrode leads are brought into contact with the electrode tabs or the battery case.

In the above-described structure, the outer circumferences of the ends of the electrode leads are not particularly restricted so long as the outer circumferences of the ends of the electrode leads are curved. Preferably, the outer circumferences of the ends of the electrode leads are rounded with a radius having a size equivalent to $1/5$ to $1/2$ the width of the electrode leads.

The ends of the electrode leads may be rounded in various methods. For example, the ends of the electrode leads may be rounded by a mechanical process, such as rolling, punching, or grinding, or a chemical process, such as etching. The above-mentioned processes are well known in the art to which the present invention pertains, and therefore, a detailed description thereof will not be given.

According to the present invention, the electrode leads are not particularly restricted so long as the electrode leads are made of a material that can be electrically connected to the electrode tabs. Preferably, the electrode leads are made of a metal plate. The metal plate may be selected from a group consisting of an aluminum plate, a copper plate, a nickel plate, a copper plate coated with nickel, and a SUS plate.

Also, the electrode leads may be connected to the electrode tabs in various manners. Preferably, the electrode leads are more stably connected to the electrode tabs by welding. The welding may include ultrasonic welding, laser welding, and resistance welding.

In accordance with another aspect of the present invention, there is provided an electrochemical cell including the electrode assembly with the above-stated construction.

The electrochemical cell is a device that provides electricity through an electrochemical reaction. For example, the electrochemical cell may be an electrochemical secondary battery or an electrochemical capacitor. Especially, the electrochemical cell is preferably applied to a lithium secondary battery.

The secondary battery includes an electrode assembly that can be charged and discharged. Preferably, the secondary battery is constructed in a structure in which an electrode assembly is mounted in a battery case made of a laminate sheet including a metal layer and a resin layer in a sealed state. The secondary battery with the above-described structure may be referred to as a pouch-shaped secondary battery.

When the ends of the electrode leads are sharp or angled as in the conventional art, the resin layer of the battery case, made of the laminate sheet, may be easily damaged, with the result that a possibility of the contact between the electrode leads and the metal layer of the battery case may be very strong. Also, current conduction occurs due to the contact between the electrode leads and the metal layer of the battery case, with the result that insulation resistance may be increased. On the other hand, when the thermal welding is weakly carried out to prevent the damage to the resin layer, the sealability of the battery case is lowered, and therefore, the safety and performance of the battery are deteriorated.

For the secondary battery including the electrode leads constructed in a structure in which the ends of the electrode leads are rounded according to the present invention, the damage to the resin layer of the battery case is prevented even when the electrode leads are brought into contact with the resin layer, and therefore, the above-described problem is fundamentally solved. This fact is proved by experiments carried out by the inventors of the present application, which will be described below.

Also, the secondary battery may be used as a unit cell for high-output, large-capacity battery packs. The unit cell (battery cell) used for high-output, large-capacity battery packs has a size greater than that of a battery cell used for small-sized battery packs. For this reason, when an external force is applied to the unit cell, impact resulting from the movement of the electrode assembly is relatively large due to a large weight of the electrode assembly. Consequently, the stable structure of the electrode leads according to the present invention is more preferably applied to the middle- or large-sized battery cell.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
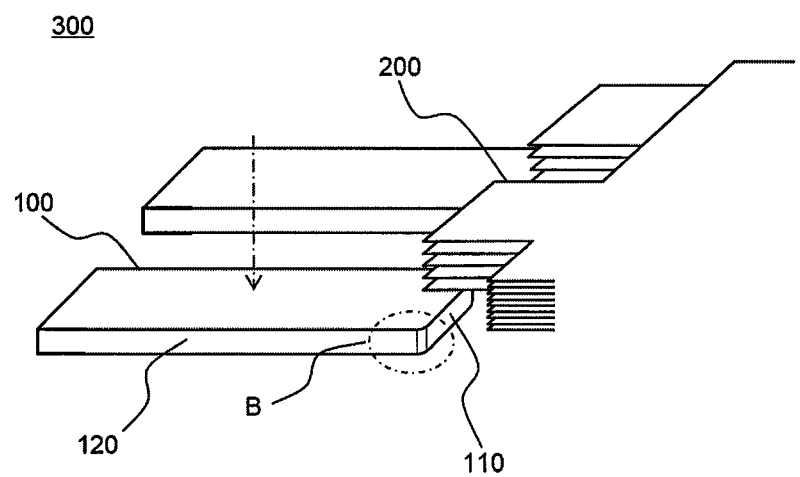
FIG. 3 is an enlarged view illustrating the connection between electrode tabs, joined to each other, and electrode leads of an electrode assembly according to a preferred embodiment of the present invention.

FIG. 3 is an enlarged view typically illustrating the connection between electrode tabs, joined to each other, and electrode leads of an electrode assembly according to a preferred embodiment of the present invention. The electrode assembly of FIG. 3 is approximately identical to the conventional electrode assembly, which is being widely used, and therefore, only the characteristics of the present invention will be described hereinafter.

Referring to FIG. 3, the electrode assembly 300 includes two electrode leads 100, each of which is constructed in a structure in which the intersections (circle B) between the upper end 110 and the opposite sides 120 of the electrode lead 100, at the side of the electrode lead 100 where electrode tabs 200 are joined to the electrode lead 100, are rounded. Specifically, when viewing the electrode lead 100 in the direction indicated by an arrow, the electrode lead 100 is constructed in a structure in which the intersections between the upper end 110 and the opposite sides 120 of the electrode lead 100 are rounded as shown in a plan view of FIG. 4.

Figure 5:
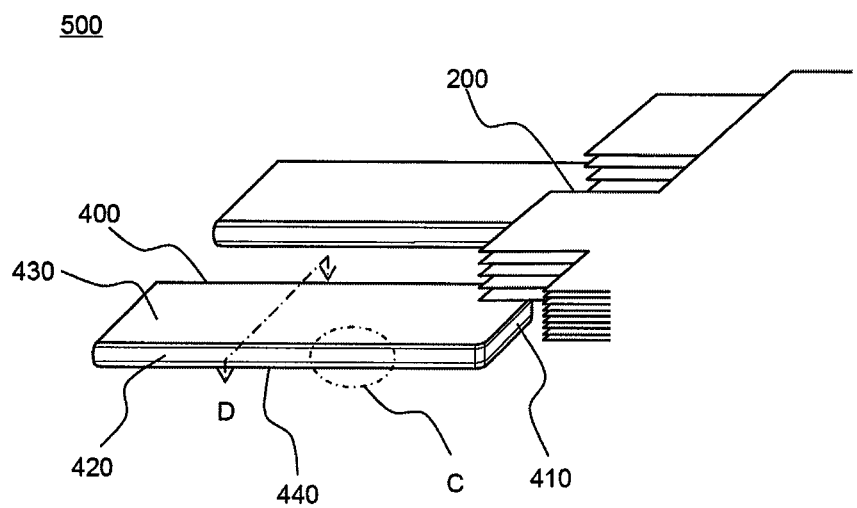
FIG. 5 is an enlarged view illustrating the connection between electrode tabs, joined to each other, and electrode leads of an electrode assembly according to another preferred embodiment of the present invention.

FIG. 5 is an enlarged view typically illustrating the connection between electrode tabs, joined to each other, and electrode leads of an electrode assembly according to another preferred embodiment of the present invention.

Figure 4:
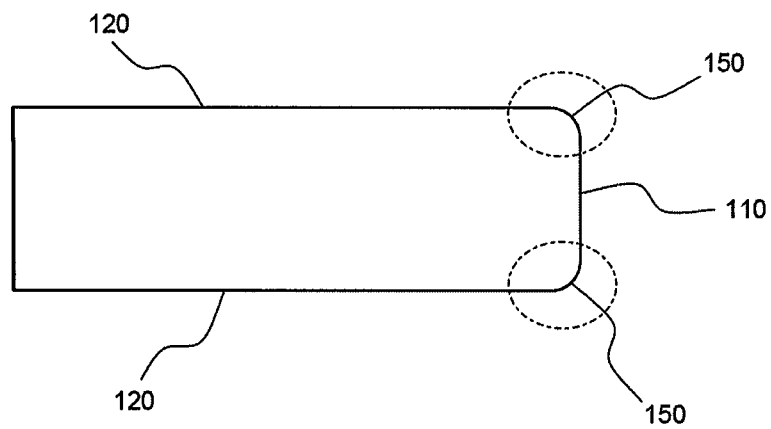
FIG. 4 is a plan view illustrating one of the electrode leads constituting the electrode assembly of FIG. 3.
Figure 6:
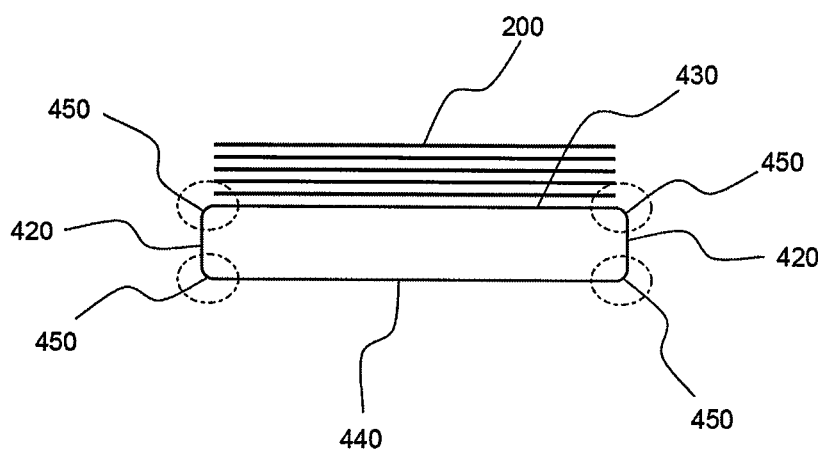
FIG. 6 is a vertical sectional view illustrating one of the electrode leads constituting the electrode assembly of FIG. 5.

Referring to FIG. 5, the electrode assembly 500 includes two electrode leads 400, each of which is constructed in a structure in which the intersections between the upper end 410 and the opposite sides 420 of the electrode lead 400, at the side of the electrode lead 400 where electrode tabs 200 are joined to the electrode lead 100, are rounded in the same manner as in FIGS. 3 and 4. In addition, each electrode lead 400 is constructed in a structure in which the intersections (circle C) between the opposite sides 420, the top 430, and the bottom 440 of the electrode lead 400, which are perpendicular to the upper end 410 of the electrode lead 410 at the side of the electrode lead 400 where the electrode tabs 200 are joined to the electrode lead 100, are rounded. Specifically, the electrode lead 400 is constructed in a structure in which the intersections between the top 430 and the opposite sides 420 and between the bottom 440 and the opposite sides 420 are rounded (indicated by reference numeral 450) as shown in FIG. 6, which is a vertical sectional view taken along line D of FIG. 5

Hereinafter, examples of the present invention will be described in more detail. It should be noted, however, that the scope of the present invention is not limited by the illustrated examples.

EXAMPLE 1

Figure 1:
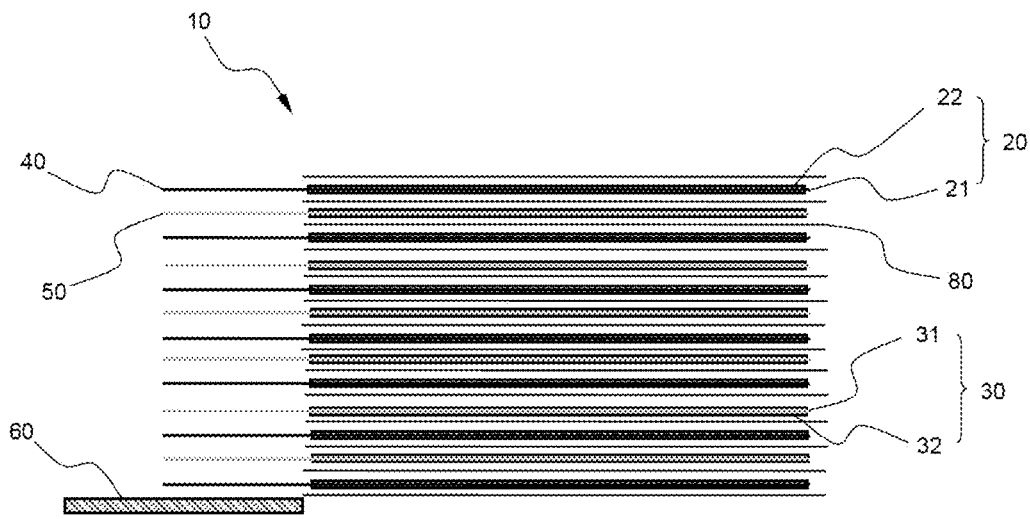
FIG. 1 is a typical view illustrating the general structure of a conventional stacking type electrode assembly.

An aluminum metal plate and a copper metal plate were punched into a predetermined size to manufacture a cathode lead and an anode lead having rounded corners as shown in FIG. 3, respectively. Subsequently, the cathode lead and the anode lead were connected to cathode tabs and anode tabs of an electrode assembly constructed in a structure in which cathodes, separators, and anodes are sequentially stacked as shown in FIG. 1. The electrode assembly, the cathode tabs and the anode tabs of which were connected to the cathode lead and the anode lead, respectively, was mounted in a battery case, an electrolyte was poured into the battery case, and the battery case was sealed to complete a battery.

EXAMPLE 2

A battery was completed in the same method as Example 1 except that a cathode lead and an anode lead having rounded edges as well as rounded corners as shown in FIG. 5 were used.

Comparative Example 1

Figure 2:
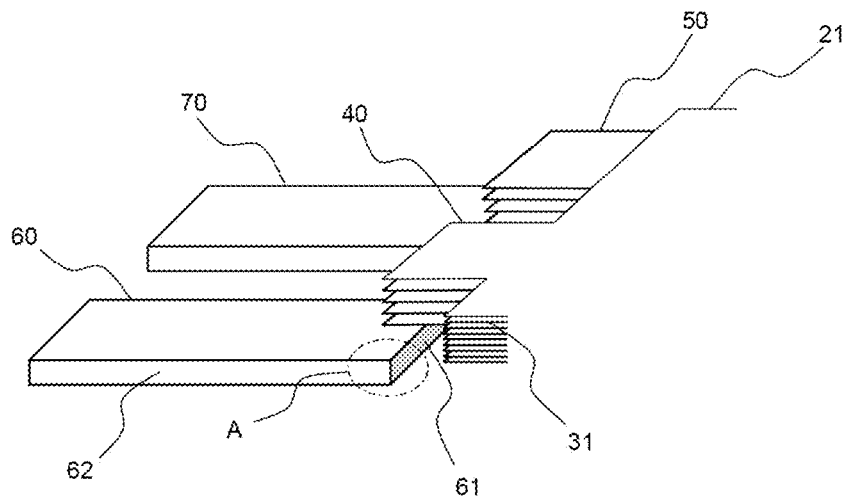
FIG. 2 is an enlarged view illustrating the connection between electrode tabs, joined to each other in a concentrated state, and electrode leads of the electrode assembly shown in FIG. 1.

A battery was completed in the same method as Example 1 except that a cathode lead and an anode lead having angled corners as shown in FIG. 2 were used.

Experimental Example 1

Front dropping experiments were carried out on the batteries manufactured according to Example 1, Example 2, and Comparative example 1. The experiment results are indicated in Table 1 below. The front dropping experiments were repeatedly carried out using 100 batteries for each example. In the front dropping experiments, the batteries were freely dropped from a height of 1.5 m such that the electrode terminals of the respective batteries collided with the ground. The damage to the electrode tabs and the tearing of the battery cases were observed.

TABLE 1

|  | Number of batteries having electrode tabs damaged during front dropping | Number of batteries having battery cases damaged during front dropping |
| --- | --- | --- |
| Example 1 | 3 | 2 |
| Example 2 | 0 | 0 |
| Comparative example 1 | 19 | 13 |

As can be seen from Table 1 above, the damage to the electrode tabs and the battery cases of the batteries manufactured according to Example 1 was greatly reduced as compared to the batteries manufactured according to Comparative example 1. It may be inferred from these data that the damage to the electrode tabs and the battery cases of the batteries was prevented by virtue of the rounded corners of the electrode leads even when the electrode tabs and the battery cases were brought into contact with each other. Especially for the batteries manufactured according to Example 2, constructed in a structure in which the edges and the corners of the electrode leads were all rounded, the batteries had neither damaged electrode tabs nor damaged battery cases, after the front dropping experiments were carried out on 100 batteries. It may be inferred from these data that the electrode leads were stably joined with the sealed portion of the battery case, by virtue of the rounded edges of the electrode leads, and therefore, the sealability of the batteries was improved, whereby a possibility of damage to the electrode tabs and the battery cases of the batteries was further reduced.

Experimental Example 2

Insulation resistance experiments were carried out on the batteries manufactured according to Example 1, Example 2, and Comparative example 1. Resistance values between the anode tabs of the batteries and metal foils in a packing material were measured, and, when the measured resistance values were less than a reference value, it was determined that the batteries had an insulation resistance defect. Because batteries having an insulation resistance defect have reduced life spans, it is difficult to apply the defected batteries to a field requiring a long-term use of batteries. The insulation resistance experiments were carried out using 100 batteries for each example. In addition, front dropping experiments were carried out on the batteries in the same manner as Experimental example 1, and then insulation resistance experiments were carried out again on the batteries. The experiment results are indicated in Table 1 below.

TABLE 2

|  | Number of batteries having insulation resistance defect | Number of batteries having insulation resistance defect after front dropping |
| --- | --- | --- |
| Example 1 | 3 | 9 |
| Example 2 | 0 | 2 |
| Comparative example 1 | 6 | 27 |

As can be seen from Table 2 above, the comparison between the batteries manufactured according to Example 1 and the batteries manufactured according to Comparative example 1 revealed that the number of the defected batteries in the batteries manufactured according to Example 1 was ½ that of the defected batteries in the batteries manufactured according to Comparative example 1 before the front dropping, and the number of the defected batteries in the batteries manufactured according to Example 1 was ⅓ that of the defected batteries in the batteries manufactured according to Comparative example 1 after the front dropping. Consequently, the comparison revealed that the insulation resistance defect ratio was greatly reduced according to the present invention.

This effect was more remarkably exhibited at the batteries manufactured according to Example 2, constructed in a structure in which the edges and the corners of the electrode leads were all rounded. Specifically, the batteries manufactured according to Example 2 had no insulation resistance defect before the front dropping, and only two batteries out of 100 had an insulation resistance defect after the front dropping. Consequently, it can be seen that, when the corners of the electrode leads were rounded according to the present invention, the damage to the electrode tabs and the battery cases was minimized, and therefore, the insulation resistance defect ratio was greatly reduced. Furthermore, it can be seen that, when using the structure according to Example 2, the sealability between the electrode leads and the battery cases was greatly improved, and therefore, the batteries had no insulation resistance defect.

INDUSTRIAL APPLICABILITY

As apparent from the above description, the electrode assembly according to the present invention has the effect of preventing the damage to the electrode tabs and/or the battery case due to the ends of the electrode leads. Furthermore, the electrode assembly according to the present invention has the effect of further improving the sealability at the sealed region of the battery case.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A stacking or stacking/folding electrode assembly of a cathode/separator/anode structure, wherein the electrode assembly is constructed in a structure comprising:
   electrode tabs having no active material applied thereto, protruding along a first direction from electrode plates constituting the electrode assembly, and electrode leads located at a side of the electrode tabs such that the electrode leads are electrically connected to the electrode tabs, which are stacked along a second direction substantially perpendicular to the first direction, and when viewing the electrode leads from above along the second direction, the electrode leads, joined to the electrode tabs, each have first and second ends spaced apart along the first direction, top and bottom surfaces spaced apart along the second direction, and opposite sides, the opposite sides connecting the first and second ends and connecting the top and bottom surfaces, wherein intersections between the first and second ends and the opposite sides of the electrode leads are rounded when viewing the electrode leads from above along the second direction and intersections between the opposite sides and the top and bottom surfaces of the electrode leads are rounded when viewing a vertical section of the electrode leads along the first direction, wherein the intersections between the first and second ends and the opposite sides of the electrode leads are rounded with a radius having a size equivalent to $1/20$ to $1/3$ a width of the electrode leads between the opposite sides, and wherein the intersections between the opposite sides and the top and bottom surfaces of the electrode leads are rounded with a radius having a size equivalent to $1/5$ to $1/2$ the width of the electrode leads.

2. The electrode assembly according to claim 1, wherein the intersections of the electrode leads are rounded by a mechanical or chemical process.

3. The electrode assembly according to claim 1, wherein the electrode leads are made of a metal plate.

4. The electrode assembly according to claim 3, wherein the metal plate is one or more selected from a group consisting of an aluminum plate, a copper plate, a nickel plate, a copper plate coated with nickel, and stainless steel plate.

5. An electrochemical cell including an electrode assembly according to claim 1.

6. The electrochemical cell according to claim 5, wherein the electrochemical cell is a secondary battery or a capacitor.

7. The electrochemical cell according to claim 6, wherein the secondary battery is constructed in a structure in which an electrode assembly is mounted in a battery case made of a laminate sheet including a metal layer and a resin layer in a sealed state.

8. A battery pack comprising the electrochemical cell according to claim 7, including the secondary battery as a unit cell.

9. A battery pack comprising the electrochemical cell according to claim 5 as a unit cell.

10. A stacking or stacking/folding electrode assembly of a cathode/separator/anode structure, wherein the electrode assembly is constructed in a structure comprising:

electrode tabs having no active material applied thereto, protruding along a first direction from electrode plates constituting the electrode assembly, and electrode leads located at a side of the electrode tabs such that the electrode leads are electrically connected to the electrode tabs, which are stacked along a second direction substantially perpendicular to the first direction, and when viewing the electrode leads from above along the second direction, the electrode leads, joined to the electrode tabs, each have first and second ends spaced apart along the first direction, top and bottom surfaces spaced apart along the second direction, and opposite sides, the opposite sides connecting the first and second ends and connecting the top and bottom surfaces, wherein intersections between the first and second ends and the opposite sides of the electrode leads are rounded when viewing the electrode leads from above along the second direction, wherein the intersections are rounded with a radius having a size equivalent to $1/5$ to $1/2$ the width of the electrode leads between the opposite sides.

11. The electrode assembly according to claim 10, wherein the intersections of the electrode leads are rounded by a mechanical or chemical process.

12. The electrode assembly according to claim 10, wherein the electrode leads are made of a metal plate.

13. The electrode assembly according to claim 12, wherein the metal plate is one or more selected from a group consisting of an aluminum plate, a copper plate, a nickel plate, a copper plate coated with nickel, and a stainless steel plate.

14. An electrochemical cell including an electrode assembly according to claim 10.

15. The electrochemical cell according to claim 14, wherein the electrochemical cell is a secondary battery or a capacitor.

16. The electrochemical cell according to claim 15, wherein the secondary battery is constructed in a structure in which an electrode assembly is mounted in a battery case made of a laminate sheet including a metal layer and a resin layer in a sealed state.

17. A battery pack comprising the electrochemical cell according to claim 16, including the secondary battery as a unit cell.

18. A battery pack comprising the electrochemical cell according to claim 14 as a unit cell.

* * * * *

UNITED STATES PATENT AND TRADEMARK OFFICE
CERTIFICATE OF CORRECTION

PATENT NO. : 8,673,476 B2
APPLICATION NO. : 12/309506
DATED : March 18, 2014
INVENTOR(S) : Ji Heon Ryu et al.

It is certified that error appears in the above-identified patent and that said Letters Patent is hereby corrected as shown below:

In the Claims

Column 10, line 23, delete "1/5 to 1/2 the" and insert therefor -- 1/20 to 1/3 a --.

Signed and Sealed this
Twenty-ninth Day of December, 2015

Michelle K. Lee
*Director of the United States Patent and Trademark Office*